Patented Apr. 26, 1932

1,855,211

UNITED STATES PATENT OFFICE

SAMUEL F. WALTON, OF HAMBURG, NEW YORK, ASSIGNOR, BY MESNE ASSIGNMENTS, TO THE PATENT AND LICENSING CORPORATION, OF BOSTON, MASSACHUSETTS, A CORPORATION OF MASSACHUSETTS

NONWEATHERING PIGMENT AND METHOD OF PREPARING THE SAME

No Drawing. Application filed April 23, 1928. Serial No. 272,347.

In my present invention I deal with certain problems involving pigments. Most mineral pigments are expensive or in a form ill adapted to certain common uses where there is desired a color effect at low cost and of permanent and workable character.

In working certain materials such as those that set on hardening or drying, it is often highly desirable to impart color or tone to the result. Ordinary pigment treatment is not satisfactory as it does not on any economical basis impart colors strongly and usually not permanently.

The desire in this art as in many other similar usages is for a cheap pigmented base which will carry a strong color value not diluted in mixture so that intensity as well as shade or tone is preserved.

The use in cements and plaster presents an immediate demand, but the ultimate utility is varied and divergent. Without needing to specify uses I may say that my object is to provide a pigmented material of dispersive character and one capable of combination in structural integrity with cements, stuccos, ceramic materials and plasters for all general purposes.

For such a use ordinary properties are useless and ordinary carrier material prohibitive in cost. My invention contemplates a color basis and a carrier base of great efficiency and economy. For example, I may use as a base a slag, cinder or other waste. Such should be preferably of siliceous nature as to be susceptible of intimate bonding with a siliceous or like glaze which will carry an earthy color or the like. Blast furnace slag represents a material of a composition and physical structure susceptible to use in accordance with my invention. Such material is very common and as a waste material very inexpensive. Its porous structure makes it wonderfully adapted to my concept and it has those combinative values incident to my invention. Such a material has a chemical stability which is very desirable.

To produce a color base from such waste product I preferably grind or reduce it to a size adapted to the ultimate mixture to be used. With such a slag grain or particle, I mix a silicate such as a sodium silicate and a pigment such as a metallic oxide or like color material.

I mix the silicate and color thoroughly and then knead it through the slag as a moist paste. This is then dried out and heated to drive out part of the chemically combined water of the silicate, thus rendering it insoluble.

The metallic silicate or glaze thus formed coats on and in the porous slag so that it becomes pigmented with the color of the metallic oxide so completely that as a diffusion medium it becomes a pigment in itself. As such it may be dispersed in cements, plasters and the like with practically the full efficiency and color value of the original oxide. The original oxide colors vary slightly in the process but are definite and controllable and satisfactory to use. The oxides on heating render the silicate insoluble so that the material will stand the weather. By reason of its physical structure it is strong and durable as a wearing surface.

In practice I take a slag such as ordinary blast furnace slag which is a calcium silicate usually carrying a metallic content such as iron and manganese and this I grind to the desired size. For a color base this is usually of a size which will pass through a 200 mesh screen.

I prepare my color treatment by mixing sodium silicate and my color base preferably a metallic oxide. I prefer such a color base because of its ability to withstand heat at the desired temperatures without change, and because it makes the silicate insoluble. For a base of this fineness I preferably use the silicate in its ordinary commercial form commonly known as water glass which is about 40° Baumé diluted by about 20% water. I knead the color base into this which brings the mixture to about the consistency of a thin syrup. The slag is added to the syrup and thoroughly mixed and then heated to a low temperature so that it will dry out under agitation.

My process is a low temperature method of coloring certain siliceous granules such as slag by means of a water soluble silicate and an insolubilizing and coloring oxide, as well as the colored granule resulting from such processes. The granules used have insoluble lime bearing silicate constituents, either natural or artificial, which constituents at the comparatively low temperature specified chemically combine with the soluble silicate to fix the coloring to the granules. The combining action is a chemical union rather than a mere physical bond resulting in a permanency of color fixation the temperatures which heretofore were not thought possible. In addition to the chemical union of the silicate with the silicate constituent of the granule itself the silicate and the coloring oxide enter into a chemical union with each other forming a complex silicate or reaction product which combines chemically with the base. This may well be described as a dual reaction, first between the soluble silicate and the metallic oxide forming a complex silicate reaction product, and second between such complex reaction product and the silicate of the base.

When thoroughly mixed I then raise the temperature to about 450° F. to complete the drying and driving off a part of the combined water in the silicate. Care should be taken not to raise the temperature so high as completely to dehydrate the soluble silicate as at that temperature all of the chemically combined water would be driven off and the silicate would become granular and lack cohesion. The particles of slag will now be found to be coated with a thin colored glaze which penetrates the pores of the slag and gives it a strong permanent color.

The penetration of the pores of the slag above mentioned is quite complete so that even if the slag particles are subsequently broken during handling or in mechanical maniplation the color values are not diminished.

I have mentioned slag as a very desirable base both as to porosity and as to availability at low price. Obviously other materials can be used and in some localities there are available either as natural deposits or as by-products, wastes which can be used. For example, there are rocks which are essentially calcium silicate which can be used advantageously. Volcanic pumices and diatomaceous earths and burned clays being of a siliceous nature may be used with the same success of bonding as in the case of the slag. The material while not necessarily a silicate is in accordance with my invention preferably so as the bonding of the color film is more intimate and the product more homogeneous where the base is a silicate.

For colors a great variety of materials may be used. Preferably these are metallic oxides or earthy materials carrying such oxides. For example, I find the following materials very well adapted for the indicated colors. For green I use a chrome oxide; for red an iron oxide; for blue I preferably use ultramarine because while it is not a true oxide it acts as one and gives a very satisfactory color. For brown I preferably use an umber. This is a clay but carries an iron oxide which gives an excellent natural brown. For yellow ochre may be used and these colors can be combined for desired shades. For black I may use a black oxide of iron. While I have indicated reactions at temperatures below 500° F. it will be understood that actual fusion of the silicate may be effected at about 1200° F. or even the slag itself may be fused at about 3000 but such temperatures involve higher cost and effect other changes not always desired.

For example, the color of the oxide may be changed. The black iron oxide may be changed to the red oxide at such temperatures and cobalt oxide which on fusion with the silicate gives a blue.

My colors may be used in various materials and mixtures as with cement in paints, stuccos, plasters, brick and tile mixtures, and in fact in almost any place and for almost any purpose where an inexpensive and durable color is required. I do not therefore wish to be limited to any particular use, size or base of mixtures, as all such are within the purview of my invention.

What I therefore claim and desire to secure by Letters Patent is:

In the method of producing a color base consisting of particles of a size of about 200 mesh or finer which particles contain sufficient alkaline earth oxides and silica to react with water soluble silicates and coloring pigments at temperatures around 450° F., those steps which consist in first wetting the particles with water, in mixing with the wetted particles a water soluble silicate and a coloring pigment, in drying the coated particles under agitation, and in heating the dried particles to a reaction temperature which will form a permanent unfused water insoluble non-weathering coloring on the particles.

In testimony whereof I affix my signature.

SAMUEL F. WALTON.